(12) United States Patent
Nakasendo et al.

(10) Patent No.: US 11,335,372 B2
(45) Date of Patent: May 17, 2022

(54) OPTICAL DISK REPRODUCING DEVICE

(71) Applicant: Panasonic Intellectual Property Management Co., Ltd., Osaka (JP)

(72) Inventors: Tsuyoshi Nakasendo, Hyogo (JP); Yoshiaki Komma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/360,256

(22) Filed: Jun. 28, 2021

(65) Prior Publication Data

US 2021/0327465 A1    Oct. 21, 2021

Related U.S. Application Data

(63) Continuation of application No. PCT/JP2020/033367, filed on Sep. 3, 2020.

(30) Foreign Application Priority Data

Jan. 15, 2020   (JP) .............................. JP2020-004174

(51) Int. Cl.
   *G11B 7/135*       (2012.01)
   *G11B 7/1374*      (2012.01)
   (Continued)

(52) U.S. Cl.
   CPC .......... *G11B 7/1374* (2013.01); *G11B 7/0941* (2013.01); *G11B 7/127* (2013.01)

(58) Field of Classification Search
   CPC ..... G11B 7/0941; G11B 7/094; G11B 7/0909; G11B 7/1378; G11B 7/0943; G11B 7/131; G11B 7/135; G11B 7/1353
   (Continued)

(56) References Cited

U.S. PATENT DOCUMENTS

2002/0131352 A1    9/2002  Kuribayashi et al.
2011/0063967 A1*   3/2011  Nakamura ........... G11B 7/0906
(Continued)

FOREIGN PATENT DOCUMENTS

JP        2002-269753       9/2002
JP           3984426       10/2007
(Continued)

OTHER PUBLICATIONS

International Search Report dated Nov. 24, 2020 in corresponding International Application No. PCT/JP2020/033367.

*Primary Examiner* — Nabil Z Hindi
(74) *Attorney, Agent, or Firm* — Wenderoth, Lind & Ponack L.L.P.

(57)       ABSTRACT

An optical disk reproducing device includes a division element that divides a reflected light reflected and diffracted by an optical disk into a light flux in a central region and light fluxes in end regions; a photodetector that has a central light receiver that receives the light flux in the central region and at least two end light receivers that receive the light fluxes in the end regions, and outputs a light amount signal corresponding to a light amount of each of the received light fluxes; a non-linear processor that receives each of the light amount signals from the central light receiver and the end light receivers, and outputs linear signals and non-linear signals obtained by processing the light amount signals by linear and non-linear arithmetic operations; an equalization processor that receives the linear signals and the non-linear signals and outputs signals each amplified with a predetermined gain; an adder that adds the amplified signals and outputs an equalization signal; a reproduction signal processor that processes the equalization signal and outputs a reproduction signal and an equalization error signal; and a (Continued)

gain controller that receives the equalization error signal and controls an amplification gain of the non-linear signals.

10 Claims, 9 Drawing Sheets

(51) Int. Cl.
*G11B 7/09* (2006.01)
*G11B 7/127* (2012.01)

(58) Field of Classification Search
USPC ....... 369/44.23, 44.24, 44.36, 44.41, 112.01, 369/112.03, 112.07, 110.03
See application file for complete search history.

(56) References Cited

U.S. PATENT DOCUMENTS

| 2012/0082201 A1 | 4/2012 | Shiraishi |
| 2015/0138942 A1 | 5/2015 | Wakabayashi et al. |

FOREIGN PATENT DOCUMENTS

| JP | 2012-79385 | 4/2012 |
| JP | 5927561 | 6/2016 |
| WO | 2013/179673 | 12/2013 |

\* cited by examiner

OPTICAL DISK REPRODUCING DEVICE

TECHNICAL FIELD

The present invention relates to an optical disk reproducing device that reproduces information recorded on an optical disk.

BACKGROUND ART

As conventional optical disks, a compact disc (CD), a digital versatile disc (DVD), and a Blu-ray (registered trademark) disc (BD) are widely known. Furthermore, in recent years, an archival disc (AD) have been announced, the AD having an increased capacity for the purpose of long-term storage of data, as compared with existing optical disks, and further increase in disk capacity is expected of these optical disks.

Means for increasing the disk capacity include reduction in track pitch, increase in density in a scanning line direction, and increase in recording layer. In particular, while the reduction in track pitch is effective for increasing the capacity, there is a problem of crosstalk that a signal recorded on an adjacent track of a scanning track is added to a detection signal, and becomes noise due to the reduction. Therefore, as a conventional optical disk reproducing device for solving this problem, as described in PTL 1, there is an optical disk reproducing device that reduces influence by crosstalk by dividing and detecting light reflected from a disk during data reproduction and appropriately processing the light.

For example, PTL 1 has disclosed that by linearly correcting, by gain control, a detection signal divided in a radial direction during disk scanning, highly accurate reproduction of a recorded signal can be achieved even if crosstalk increases.

Further, PTL 2 has proposed a technique of reducing crosstalk by a three-track detection signal system using not only a reproduction track detection signal but also adjacent track detection signals, the reproduction track detection signal being obtained by irradiating, with laser, a target track whose recorded data is to be read, and the adjacent track detection signals being obtained by irradiating, with laser, two adjacent tracks. Further, PTL 3 has disclosed a method of accurately synchronizing three track detection signals with a simple configuration in a three-track detection signal system.

CITATION LIST

Patent Literatures

PTL 1: International Publication No. 2013/179673
PTL 2: Unexamined Japanese Patent Publication No. 2002-269753
PTL 3: Unexamined Japanese Patent Publication No. 2012-079385

SUMMARY

However, in order to further improve the capacity of the optical disk, when the track pitch is reduced from 0.24 μm assumed in PTL 1, a reproduction track whose recorded data is to be read, and the adjacent tracks thereof come close to each other, so that a signal component recorded on the reproduction track and signal components recorded on the adjacent tracks correlate with one another, or the recorded signals of each of the tracks are non-linearly modulated as reflected light. Therefore, not only linear but also non-linear crosstalk increases, and it is difficult to achieve highly accurate reproduction of the recorded signal by the linear crosstalk canceling means in PTL 1. Also, in the three-track detection signal system described in PTLs 2 and 3, since linear waveform equalization processing of the track detection signal is premised, the effect of suppressing crosstalk in the narrow track pitch is limited.

The present invention solves the above-described problems, and achieves highly accurate reproduction of a recorded signal with a high effect of suppressing crosstalk even if a track pitch is narrower than a conventional track pitch. An object of the present invention is to provide an optical disk reproducing device that achieves a further increase in capacity by improving a track density.

An optical disk reproducing device according to one aspect of the present invention is an optical disk reproducing device that has a groove-shaped track and reproduces information recorded on an optical disk capable of recording the information in a land portion and a groove portion of a groove, the optical disk reproducing device including: a laser light source that emits a light flux of a wavelength $\lambda$; an objective lens with numerical aperture NA that allows the light flux emitted from the laser light source to be condensed and form a condensing spot on the optical disk; and a division element that has a central region and at least two end regions sandwiching the central region, and divides a reflected light reflected and diffracted by the optical disk into a light flux in the central region and light fluxes in the end regions; a photodetector that has a central light receiver that receives the light flux in the central region and two end light receivers that receive the light fluxes in the end regions, and outputs a light amount signal corresponding to a light amount of each of the received light fluxes; a non-linear processor that receives each of the light amount signals from the central light receiver and the end light receivers, and outputs linear signals and non-linear signals obtained by processing the light amount signals by linear and non-linear arithmetic operations; an equalization processor that receives the linear signals and the non-linear signals and outputs signals each amplified with a predetermined gain; an adder that adds the amplified signals and outputs an equalization signal; a reproduction signal processor that processes the equalization signal and outputs a reproduction signal and an equalization error signal; and a gain controller that receives the equalization error signal and controls an amplification gain of the non-linear signals, wherein the photodetector has the central light receiver that receives the light flux in the central region and the at least two end light receivers that receive the light fluxes in the two end regions, and outputs the light amount signal corresponding to the light amount of each of the received light fluxes, and the non-linear processor outputs the light amount signals as they are, or the linear signals each obtained by multiplying each of the light amount signals by a predetermined gain, and outputs arithmetic operation results of products of the light amount signals as the non-linear signals, each of the products of the light amount signals being obtained by combining two or more among the light amount signals, the combination being at least one type of combination.

The optical disk reproducing device in the present disclosure has a high effect of suppressing non-linear crosstalk that occurs at a narrower track pitch than a track pitch of a conventional optical disk reproducing device, and achieves highly accurate reproduction of a recorded signal, and can achieve a further increase in capacity by improving a track density.

DESCRIPTION OF EMBODIMENTS

Hereinafter, exemplary embodiments of the present invention will be described with reference to the drawings as needed. Note that even if there is an exemplary embodiment that is described in the present specification but is not described here as corresponding to the invention, it does not mean that the exemplary embodiment does not correspond to the invention. On the contrary, even if the exemplary embodiment is described here as corresponding to the invention, it does not mean that the exemplary embodiment does not correspond to an invention other than the invention.

First Exemplary Embodiment

Figure 1:
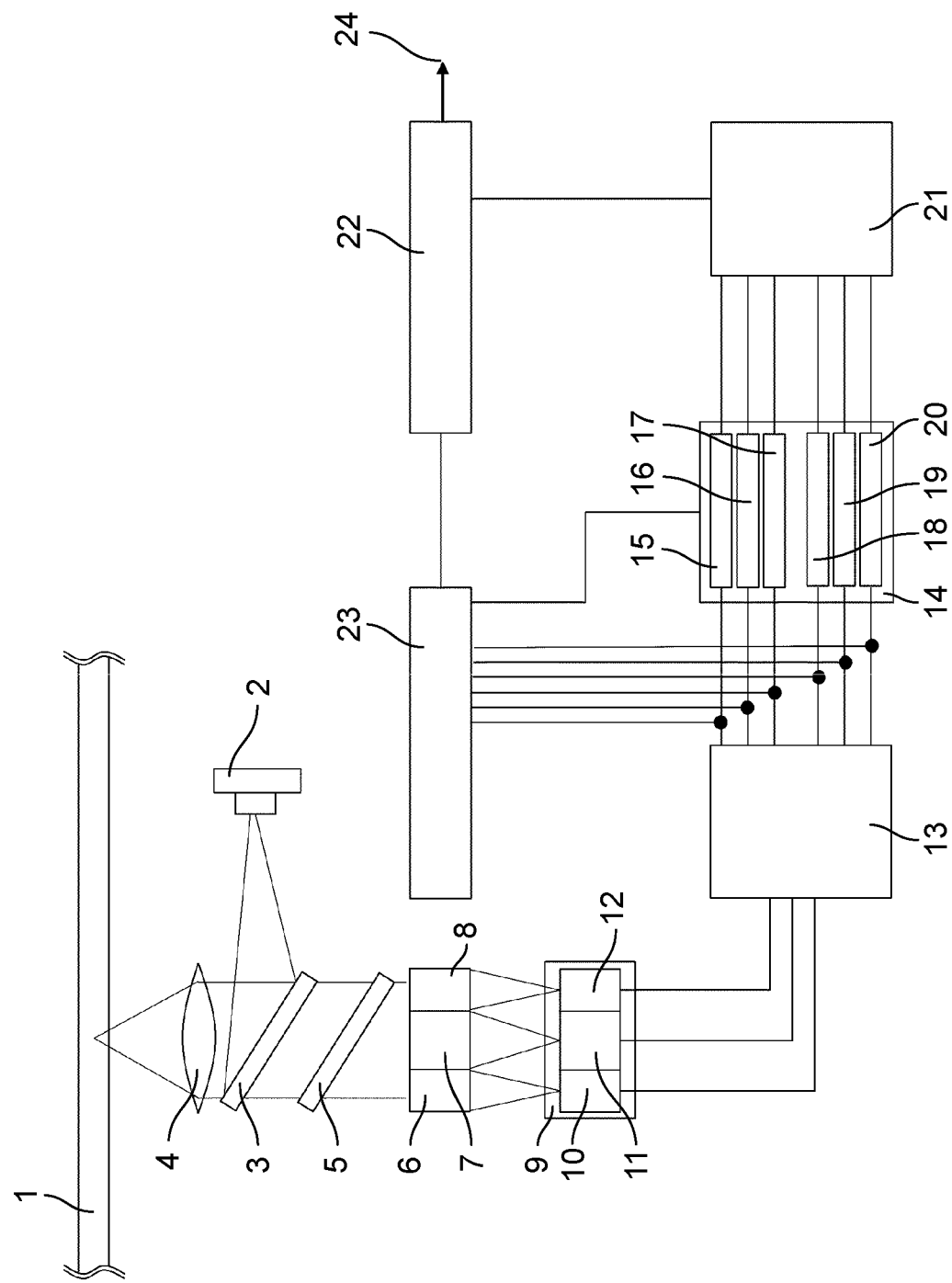
FIG. 1 is a schematic diagram showing a configuration of an optical disk reproducing device according to a first exemplary embodiment of the present invention.
Figure 2:
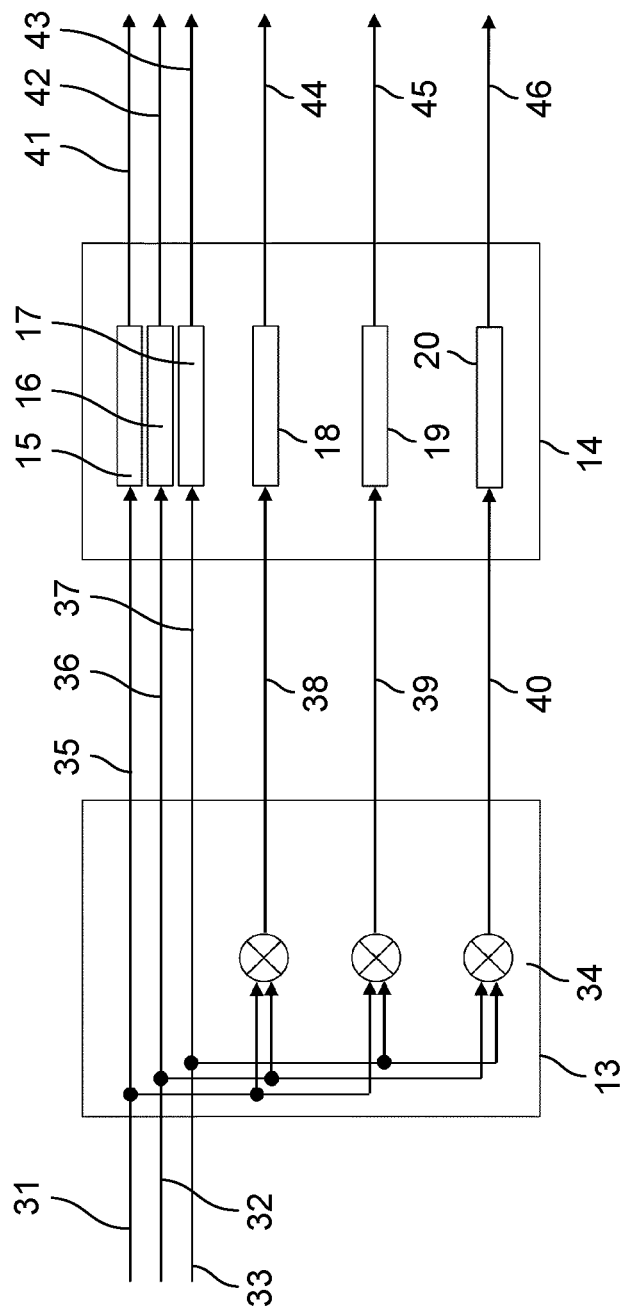
FIG. 2 is a diagram showing configurations of a non-linear processor and an equalization processor of the optical disk reproducing device according to the first exemplary embodiment of the present invention.
Figure 3:
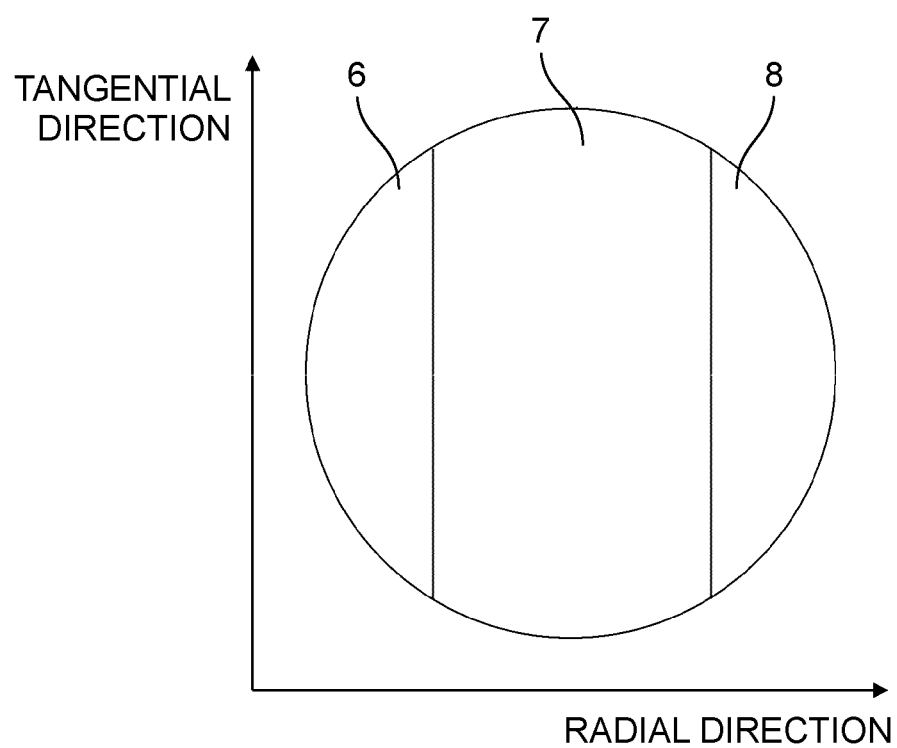
FIG. 3 is a diagram showing a division configuration of a division element of the optical disk reproducing device according to the first exemplary embodiment of the present invention.

FIG. 1 is a schematic diagram showing a configuration of an optical disk reproducing device according to a first exemplary embodiment of the present invention. FIG. 2 is a diagram showing configurations of a non-linear processor and an equalization processor of the optical disk reproducing device according to the first exemplary embodiment of the present invention. FIG. 3 is a diagram showing a division configuration of a division element according to the first exemplary embodiment of the present invention.

Optical disk reproducing device 100 is a device that is recorded on optical disk 1 and reproduces data. Optical disk reproducing device 100 includes blue semiconductor laser unit 2, laser mirror 3, objective lens 4, beam splitter 5, division element 70, photodetector 9, non-linear processor 13, equalization processor 14, adder 21, reproduction signal processor 22, and gain controller 23.

Optical disk 1 has a groove-shaped track, and data is recorded on a land portion and a groove portion of a groove. In the present exemplary embodiment, for example, a track pitch is 0.18 μm, the track pitch being a distance between the land portion and the groove portion.

Blue semiconductor laser unit 2 is a laser light source that emits a light flux having wavelength λ, and wavelength λ of light emitted from blue semiconductor laser unit 2 is a wavelength of 400 nm to 415 nm. For example, in the present exemplary embodiment, blue semiconductor laser unit 2 is configured to emit a light beam (light flux) having a wavelength of approximately 405 nm.

Objective lens 4 is an objective lens having numerical aperture NA that allows the light flux emitted from blue semiconductor laser unit 2 to be condensed and form a condensing spot on optical disk 1. For example, in the present exemplary embodiment, objective lens 4 is configured to condense the light beam having the wavelength of approximately 405 nm with numerical aperture NA of 0.91.

Division element 70 is a diffraction element manufactured to operate as a diffraction grating by forming fine grooves on a glass surface. Division element 70 has central region 7 and two end regions 6, 8. As shown in FIG. 3, division element 70 has, for example, a disk shape, and is divided into three along a direction corresponding to a radial direction of optical disk 1 (a direction orthogonal to a tangential direction of optical disk 1), and is divided into central region 7 and two end regions 6, 8 sandwiching central region 7. An area ratio of the three regions divided in the direction corresponding to the radial direction is set or designed appropriately to suppress crosstalk.

Photodetector 9 has three light receivers 10, 11, 12.

Non-linear processor 13 is configured with multipliers 34. Light amount signals 31, 32, 33 from three light receivers 10, 11, 12 included in photodetector 9 are input, respectively. Non-linear processor 13 has systems 35 to 37 that output the input signals as they are, and systems 38 to 40 that output product arithmetic operations of the input signals by multipliers 34. While systems 35 to 37 that output the input signals as they are output signals obtained by multiplying the input light amount signals 31, 32, 33 by one, respectively, linear signals each obtained by multiplying each of light amount signals 31, 32, 33 by each predetermined coefficient may be output.

Equalization processor 14 has amplifiers 15 to 20. Amplifiers 15 to 17 receives output signals 35 to 37 from non-linear processor 13. Amplifiers 18 to 20 receives output signals 38 to 40 from non-linear processor 13. Amplifiers 15 to 20 are gain variable amplifiers each capable of varying a gain. Equalization processor 14 dynamically performs optimum error control by correcting the gains of amplifiers 15 to 20 with a correction signal from gain controller 23 described below.

Gain controller 23 controls the gains of amplifiers 15 to 20. That is, the gains of amplifiers 15 to 20 are set to optimum gains by gain controller 23. Gain controller 23 receives input signals to amplifiers 15 to 20 of equalization processor 14, the input signals being output by non-linear processor 13, and an equalization error output by reproduction signal processor 22, and a gain correction signal calculated by, for example, least mean square (LMS) algorithm is output to amplifiers 15 to 20 of equalization processor 14.

Adder 21 adds the signals amplified with the optimum gains and outputs an equalization signal.

Reproduction signal processor 22 processes the equalization signal and outputs reproduction signal 24. Reproduction signal processor 22 has a device that estimates a recorded signal, such as a maximum likelihood decoder for Vitabi decoding or the like, or a MAP (Maximum A posteriori Probability) decoder for BCJR decoding or the like, and outputs an estimated signal of, for example, a binarized or multi-valued recording signal as reproduction signal 24. As a result, in the equalization signal output from adder 21, crosstalk from adjacent tracks is suppressed, so that reproduction signal processor 22 reproduces a highly accurate reproduction signal. Further, reproduction signal processor 22 generates an evaluation value of the reproduction signal and supplies the evaluation value to gain controller 23. In the present exemplary embodiment, for example, the equalization error is generated as the evaluation value. The equalization error is calculated as a difference between a reference signal calculated from the recorded signal estimated, for example, by Viterbi decoding, transmission line characteristics and the like, and the equalization signal input to reproduction signal processor 22.

In FIG. 1, a crosstalk canceller that cancels crosstalk from adjacent tracks of optical disk 1 is configured with division element 70, photodetector 9, non-linear processor 13, amplifiers 15 to 20, adder 21, reproduction signal processor 22, gain controller 23, and the like. The configurations of the gain controller and the amplifiers are not particularly limited to the illustrated example, and for example, a gain variable amplifier circuit including a gain controller and at least three amplifiers may be used. Here, the effect of crosstalk cancellation is determined by a ratio of gains given to respective amplifiers 15 to 20. While a gain value is effective even if it is a DC value, a higher effect can be obtained by giving it as a tap coefficient of a digital filter having a frequency characteristic.

With the above configuration, optical disk reproducing device 100 operates as follows.

The light beam emitted from blue semiconductor laser unit 2 is reflected by laser mirror 3 and directed toward objective lens 4. A blue light beam focused by objective lens 4 is condensed and irradiated, for example, on groove portion G (or land portion L) on an information recording surface of optical disk 1. Reflected light reflected and diffracted on the information recording surface passes through objective lens 4 as in an outward way, and passes through laser mirror 3 and beam splitter 5, and reaches division element 70. The reflected light input to division element 70 is divided in different directions by the diffraction gratings of end region 6, central region 7, and end region 8 of the division element. After that, the divided light beams enter three different light receivers 10, 11, 12, of photodetector 9, respectively. That is, the light beam that has passed through central region 7 enters light receiving portion 11 (central light receiver) of photodetector 9, the light beam that has passed through end region 6 enters light receiver 10 (end receiver), and the light beam that has passed through end region 8 enters light receiver 12 (end light receiver). Photodetector 9 outputs the light amount signals corresponding to amounts of light received by light receivers 10, 11, 12, and each of the light amount signals is input to non-linear processor 13. By dividing the reflected light into the respective light amount signals by division element 70 as described above, it is possible to give the light amount signals different characteristics of adjacent track components. Non-linear processor 13 outputs output signals 35 to 37 and output signals 38 to 40 to equalization processor 14, output signals 35 to 37 resulting from outputting the input signals as they are, output signals 38 to 40 resulting from outputting the product arithmetic operations of the input signals by multipliers 34 from input light amount signals 31 to 33. Equalization processor 14 dynamically performs the optimum error control by correcting the gains of the amplifiers by the correction signal from gain controller 23. After that, adder 21 outputs the equalization signal from the signals amplified with the optimum gains, and reproduction signal processor 22 outputs the estimated signal of the recorded signal from the equalization signal as reproduction signal 24. In this manner, by generating the signals of the products of the light amount signals with different characteristics, it is possible to effectively suppress the non-linear crosstalk components that correlate between tracks, so that the high accuracy reproduction signal can be acquired even with a narrow track pitch.

Further, in the optical disk reproducing device of the present exemplary embodiment, one device does not necessarily perform only recording and reproduction with a single type of groove spacing and land-groove spacing, but recording and reproduction of optical disks with a plurality of different types of different groove spacing and land-groove spacing may be made compatible. At this time, an appropriate gain may be given to each of amplifiers 15 to 20 of equalization processor 14 in accordance with disk conditions such as the parameters of the groove spacing and the land-groove spacing, and the optical configuration including blue semiconductor laser unit 2. Alternatively, the crosstalk canceller configuration described above may be used to learn to adaptively obtain the optimum gain.

Second Exemplary Embodiment

Figure 4:
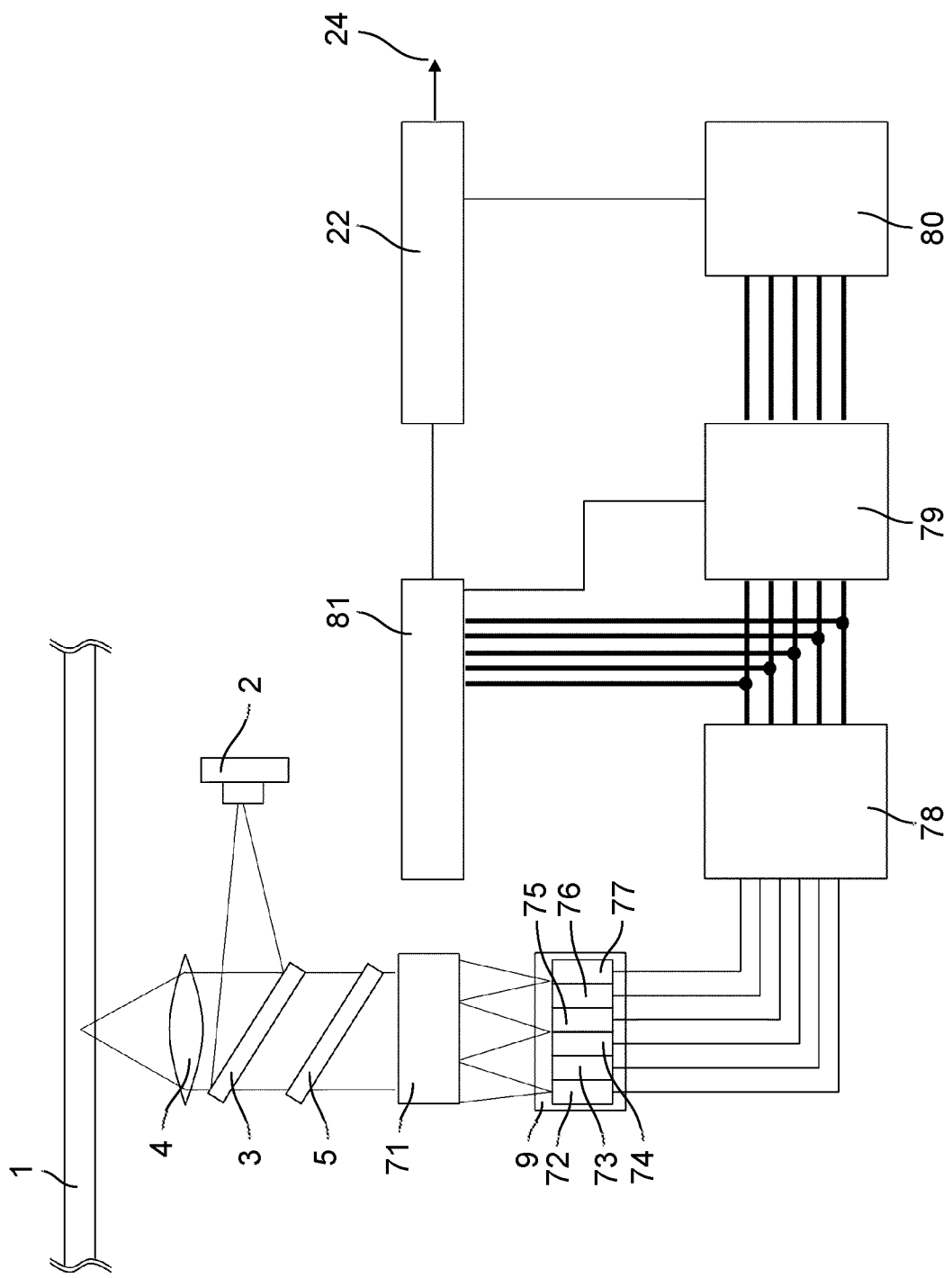
FIG. 4 is a schematic diagram showing a configuration of an optical disk reproducing device according to a second exemplary embodiment of the present invention.
Figure 5:
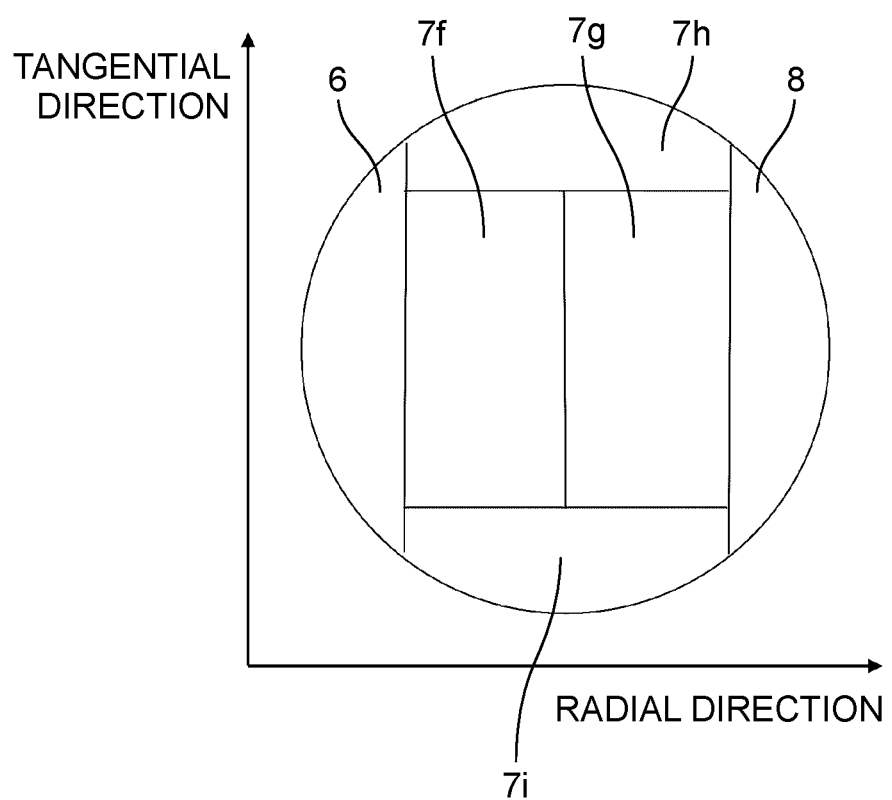
FIG. 5 is a diagram showing a division configuration of a division element of the optical disk reproducing device according to the second exemplary embodiment of the present invention.
Figure 6:
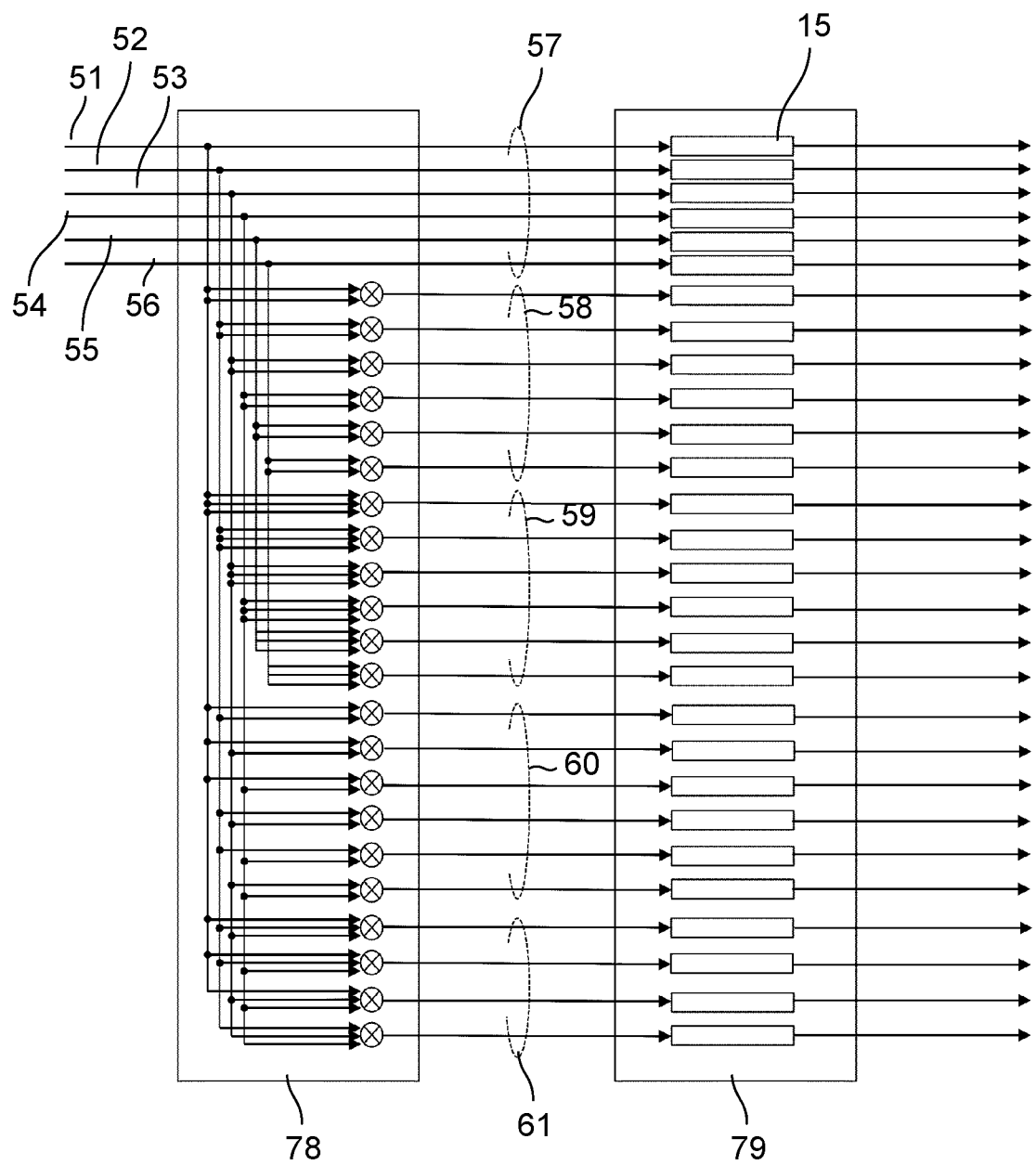
FIG. 6 is a diagram showing configurations of a non-linear processor and an equalization processor of the optical disk reproducing device according to the second exemplary embodiment of the present invention.

FIG. 4 is a schematic diagram showing a configuration of an optical disk reproducing device according to a second exemplary embodiment of the present invention. FIG. 5 is a diagram showing a division configuration of a division element of the optical disk reproducing device according to the second exemplary embodiment of the present invention. FIG. 6 is a configuration diagram showing a non-linear processor and an equalization processor of the optical disk reproducing device according to the second exemplary embodiment of the present invention. In FIG. 4, same components as those in FIG. 1 will be denoted by same reference marks, and description thereof will be omitted. In FIG. 4, differences from FIG. 1 are that division element 71, photodetector 9, non-linear processor 78, equalization processor 79, adder 80, and gain controller 81 are used.

Division element 71 is a diffractive element manufactured to operate as a diffraction grating by forming fine grooves on a glass surface. As shown in FIG. 5, division element 71 is divided into three in a direction corresponding to a radial direction of optical disk 1, and central regions 7$f$, 7$g$, 7$h$, 7$i$ and two end regions 6, 8 sandwiching the central regions. Further, central regions 7$f$, 7$g$, 7$h$, 7$i$ are divided into three in a direction corresponding to a tangential direction of optical disk 1 so as to be center regions 7$f$, 7$g$ and two end regions 7$h$, 7$i$ sandwiching the center regions. Subsequently, center regions 7$f$, 7$g$ are divided into two in the direction corresponding to the radial direction of optical disk 1 so as to be two divided center regions 7$f$ and 7$g$. Widths of these six divided regions, that is, boundaries of the regions are appropriately set or designed to improve accuracy of crosstalk cancellation.

In accordance with the fact that division element 71 is a six-division element, photodetector 9 also includes six light receivers 72 to 77. The six division elements and the six light receivers are connected on a one-to-one basis, and each outputs a light amount signal to non-linear processor 78.

FIG. 6 shows non-linear processor 78 and equalization processor 79 of the optical disk reproducing device according to the second exemplary embodiment of the present invention. When an example of combination of each of the regions of division element 71 in FIG. 5, photodetector 9 in FIG. 4, and light amount signals 51 to 56 in FIG. 6 according to the present exemplary embodiment is summarized, region 7$f$ of division element 71 in FIG. 5, photodetector 72 in FIG. 4, and light amount signal 51 in FIG. 6 correspond to one another, region 7$g$ of division element 71 in FIG. 5, photodetector 73 in FIG. 4, and light amount signal 52 in FIG. 6 correspond to one another, region 6 of division element 71 in FIG. 5, photodetector 74 in FIG. 4, and light amount signal 53 in FIG. 6 correspond to one another, region 8 of division element 71 in FIG. 5, photodetector 75 in FIG. 4, and light amount signal 54 in FIG. 6 correspond to one another, region 7$g$ of division element 71 in FIG. 5, photodetector 76 in FIG. 4, and light amount signal 55 in FIG. 6 correspond to one another, and region 7$i$ of division element 71 in FIG. 5, photodetector 77 in FIG. 4, and light amount signal 56 in FIG. 6 correspond to one another.

In non-linear processor 78, there exist system 57 that branches light amount signals 51 to 56 and outputs them as they are, system 58 that outputs square of each of light amount signals 51 to 56, system 59 that outputs a cube of each of light amount signals 51 to 56, system 60 that outputs products of combinations of any two of light amount signals 51 to 54, and system 61 that outputs products of combinations of any three of light amount signals 51 to 54. Equalization processor 79 receives output signal systems 57 to 61 of non-linear processor 78, and includes one amplifier for each of the signal lines. For example, amplifier 15 receives a signal resulting from outputting light amount signal 51 as it is by non-linear processor 78. As described in the first exemplary embodiment, each of the amplifiers may have a DC coefficient or a tap coefficient of a digital filter having a frequency characteristic. Further, while the digital filter is configured with, for example, a finite impulse response (FIR) filter, a configuration may be employed where a tap length of the filter differs depending on a type of the input signal for the purpose of reducing a number of circuits, or a configuration may be employed where a part of taps are not used for equalization arithmetic operation. Equalization processor 79 inputs output of each of the amplifiers to adder 80 in FIG. 4. Adder 80 outputs a signal resulting from adding the output of the amplifiers to reproduction signal processor 22 as an equalization signal. Gain controller 81 receives the input signals of the amplifiers of equalization processor 79 from non-linear processor 78 and an equalization error signal from reproduction signal processor 22, and outputs a gain correction signal for the respective amplifiers of equalization processor 79. Five thick lines in FIG. 4 indicate combinations of a plurality of signal lines, and correspond to five output signal systems 57 to 61 of non-linear processor 78 in FIG. 6, respectively.

Third Exemplary Embodiment

Figure 7:
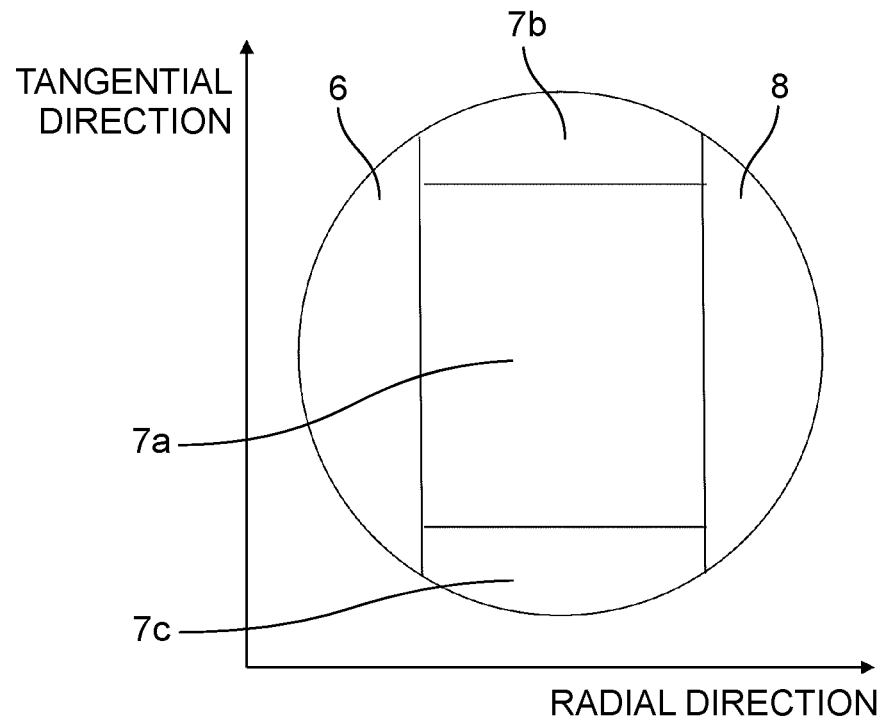
FIG. 7 is a diagram showing a division configuration of a division element of an optical disk reproducing device according to a third exemplary embodiment of the present invention.

FIG. 7 is a diagram showing a division configuration of a division element of an optical disk reproducing device according to a third exemplary embodiment of the present invention. In the optical disk reproducing device according to the third exemplary embodiment of the present invention, for division element 70 in FIG. 1, a configuration in FIG. 7 is replaced with the configuration of FIG. 3, and for photodetector in FIG. 1, the configuration of three photodetectors 9 are replaced with four photodetectors 9. Since change in a number of signal lines and the like with these changes in the configuration is equivalent to the change from three in the first exemplary embodiment to six in the second exemplary embodiment, the illustration will be omitted here, and a division element, which is a clear difference, will be particularly described. FIG. 7 shows central region 7 obtained by further dividing central region 7 in FIG. 3 into three in a direction corresponding to a tangential direction of optical disk 1, and has center region 7$a$ and end regions 7$b$ and 7$c$ sandwiching center region 7$a$. An area or a boundary of each of the regions is appropriately set or designed to improve accuracy of crosstalk cancellation.

Fourth Exemplary Embodiment

Figure 8:
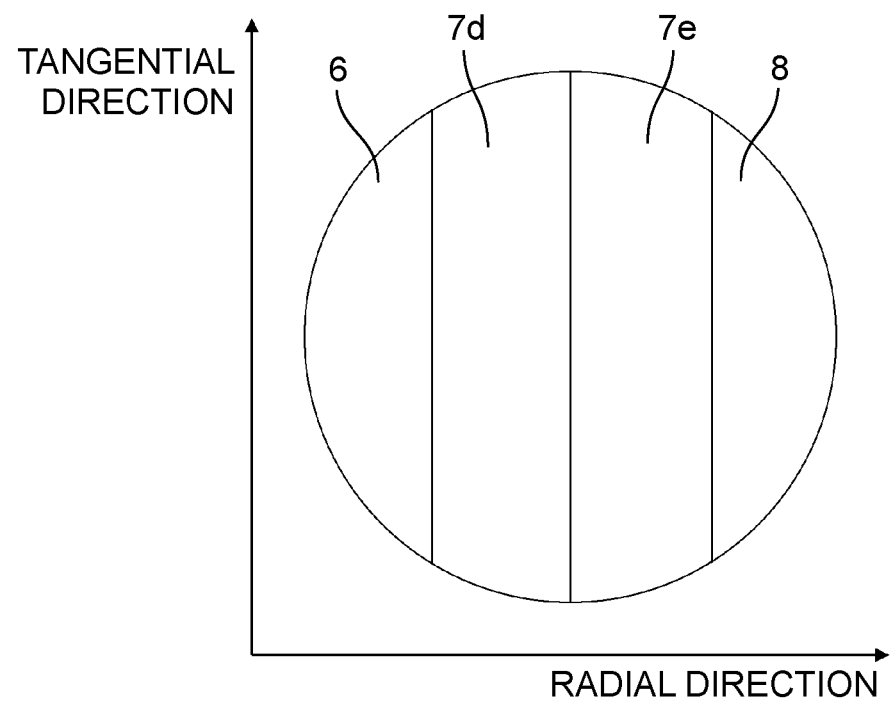
FIG. 8 is a diagram showing a division configuration of a division element of an optical disk reproducing device according to a fourth exemplary embodiment of the present invention.

FIG. 8 is a diagram showing a division configuration of a division element of an optical disk reproducing device according to a fourth exemplary embodiment of the present invention. In the optical disk reproducing device according to the fourth exemplary embodiment of the present invention, for division element 70 in FIG. 1, the configuration of FIG. 3 is replaced with a configuration in FIG. 8, and for photodetector 9 in FIG. 1, the configuration of three photodetectors 9 is replaced with a configuration of four photodetectors 9. Since change in a number of signal lines and the like with these changes in the configuration is equivalent to the change from three in the first exemplary embodiment to six in the second exemplary embodiment, the illustration will be omitted here, and a division element, which is a clear difference, will be particularly described. FIG. 8 shows a configuration obtained by further dividing central region 7 in FIG. 3 into two in a direction corresponding to a radial direction of optical disk 1, and has two divided center regions 7$d$ and 7$e$. An area or a boundary of each of the regions is appropriately set or designed to improve accuracy of crosstalk cancellation.

Fifth Exemplary Embodiment

Figure 9:
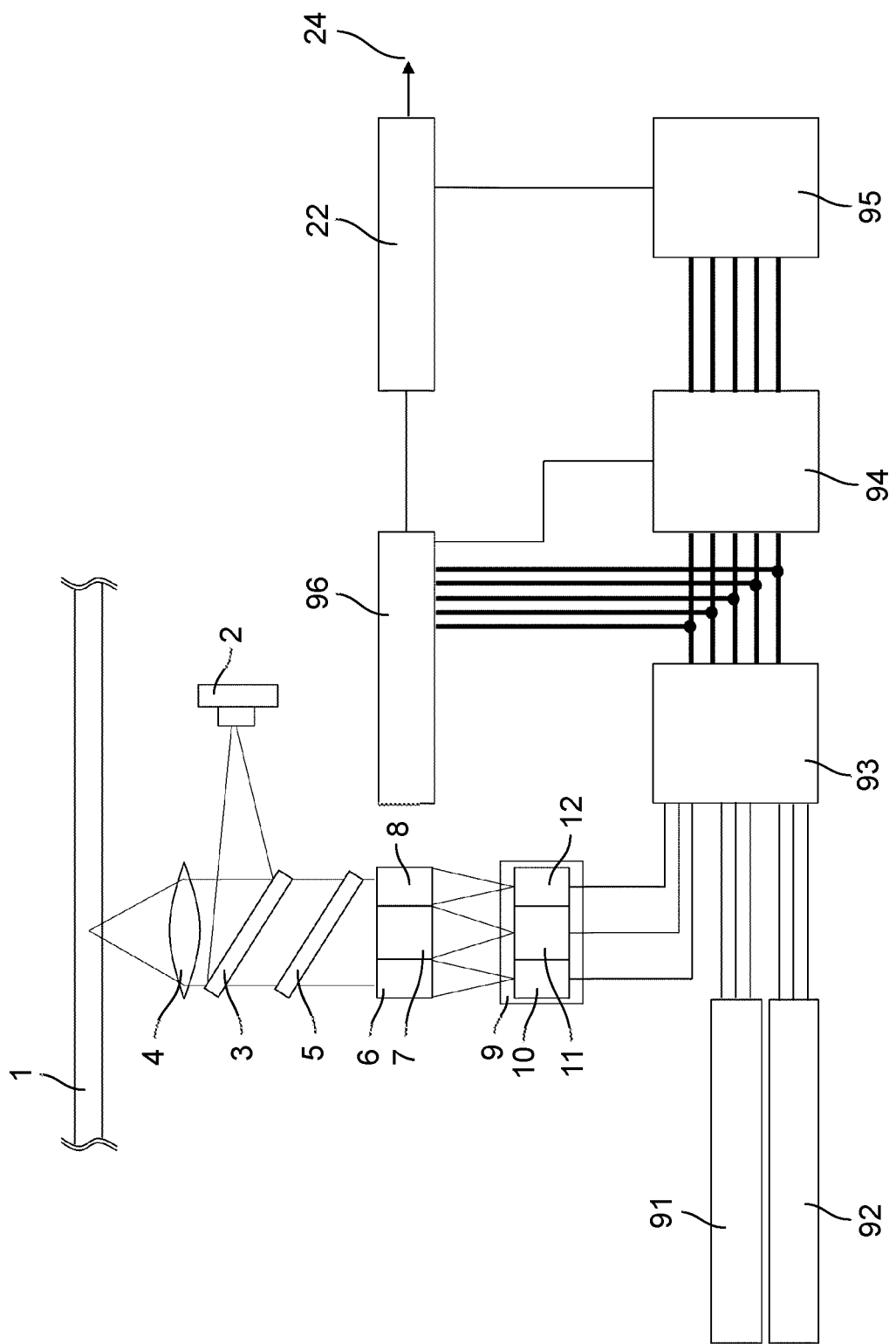
FIG. 9 is a schematic diagram showing a configuration of an optical disk reproducing device according to a fifth exemplary embodiment of the present invention.
Figure 10:
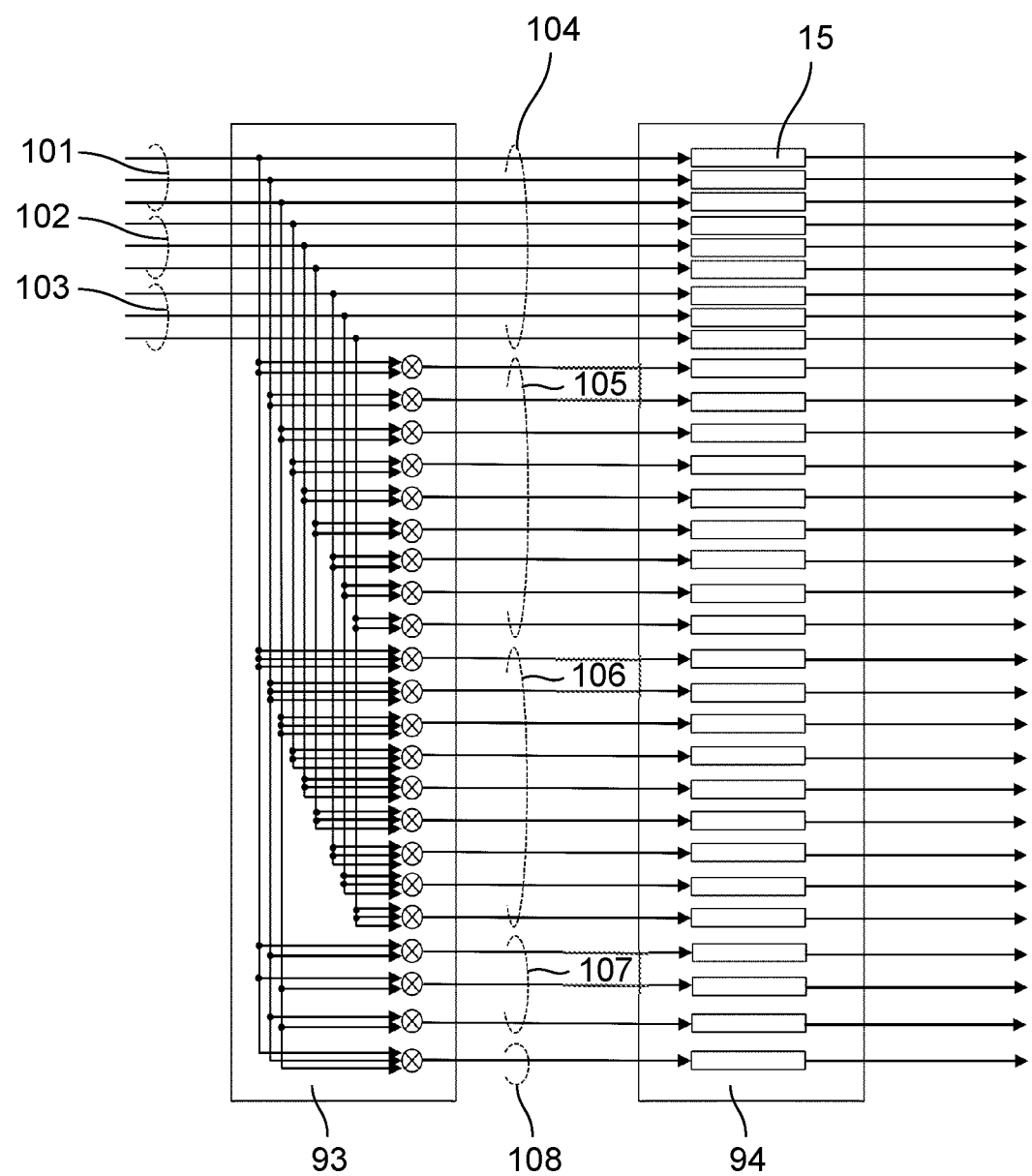
FIG. 10 is a diagram showing configurations of a non-linear processor and an equalization processor of the optical disk reproducing device according to the fifth exemplary embodiment of the present invention.

FIG. 9 is a schematic diagram showing a configuration of an optical disk reproducing device according to a fifth exemplary embodiment of the present invention. FIG. 10 is a diagram showing a non-linear processor and an equalization processor of the optical disk reproducing device according to the fifth exemplary embodiment of the present invention. In the fifth exemplary embodiment, an exemplary embodiment of the present invention in a case where detection signals for three tracks are used, which has been described in PTL 2 or PTL 3, will be described.

In FIG. 9, same components as those in FIG. 1 are denoted by same reference marks, and description thereof will be omitted. In FIG. 9, differences from FIG. 1 are that adjacent-track detection signal generators 91 and 92, non-linear processor 93, equalization processor 94, adder 95, and gain controller 96 are used. Adjacent-track detection signal generators 91 and 92 output detection signals (light amount signals) of two tracks adjacent to a target track whose information is to be acquired. Adjacent-track detection signal generators 91 and 92 may have, for example, a same configuration as the detection systems from blue semiconductor laser unit 2 to photodetector 9 of the first exemplary embodiment, and may be configured to output the light amount signals of the two tracks adjacent to the target track whose information is to be acquired by each of the adjacent-track detection signal generators 91 and 92 simultaneously scanning the adjacent tracks when the target track whose information is to be acquired is scanned in the present exemplary embodiment.

Alternatively, adjacent-track detection signal generators 91 and 92 may be configured, for example, to acquire, in advance, the detection signals of the two tracks adjacent to the target track whose information is to be acquired, and store them in a memory or the like and output the detection signals of the two adjacent tracks in line with scanning of the target track whose information is to be acquired. In this case, a configuration may be employed where the adjacent track of the target track whose information is to be acquired is scanned, and the signals stored in the memory are the detection signal of the target track whose information is to be acquired and the detection signal of the other adjacent track.

Alternatively, a configuration of adjacent-track detection signal generators 91 and 92 may be a combination of a configuration where one of them is a detection system from blue semiconductor laser unit 2 to photodetector 9 of the first exemplary embodiment, and a configuration where in the other, the detection signals of the target track whose information is to be required or the adjacent tracks are stored in the memory or the like. In either case, it is assumed that the detection signals (light amount signals) of the three detected tracks are synchronized.

The detection signals (light amount signals) of these three tracks are input to non-linear processor 93 shown in FIGS. 9 and 10. Non-linear processor 93 shown in detail in FIG. 10 receives the light amount signals of the target track as signal group 101, three pieces of information of photodetector 9 being to be acquired for the target track. Further, three adjacent-track light amount signals of adjacent-track detection signal generators 91 and 92 are input as signal groups 102 and 103, respectively. Non-linear processor 93 outputs, as signal group 104, a total of nine input track light amount signals as they are, or signals obtained by multiplying each of the input track light amount signals by a predetermined coefficient. Non-linear processor 93 also outputs signals obtained by squaring each of the total of nine input track light amount signals as signal group 105. Non-linear processor 93 also outputs signals obtained by cubing each of the nine input track light amount signals as signal group 106. Non-linear processor 93 also outputs, as 107, a group of products of any two of the signals in input signal group 101. Non-linear processor 93 also outputs, as 108, a group of products of any three of signals in input signal group 101.

Equalization processor 94 receives linear and non-linear signals 104 to 108 output by non-linear processor 93, and equalization processor 94 outputs linear and non-linear signals 104 to 108 each multiplied by a predetermined gain by an amplifier. For example, in FIG. 10, each of amplifiers 15 amplifies one of light amount signals 101 by the predetermined gain. As described in the first exemplary embodiment, each of the amplifiers may have a DC coefficient or a tap coefficient of a digital filter having a frequency characteristic. Further, while in the present exemplary embodiment, the product signals indicate only the combinations of the light amount signals output from the photodetectors of the same track, the present invention is not limited to this, and the product signals may be configured of production signals of combinations of arbitrary two or more light amount signals obtained by detection in a plurality of tracks.

Adder 80 receives added signals of the output of the amplifiers of equalization processor 94, and adds the added signals to output the resultant to reproduction signal processor 22 as an equalization signal. Gain controller 96 receives the input signals to the amplifiers of equalization processor 94 from non-linear processor 93 and an equalization error signal from reproduction signal processor 22, and outputs a gain correction signal of each of the amplifiers of equalization processor 94. In FIG. 9, for example, five thick lines connecting non-linear processor 93 and equalization processor 94 indicate the combinations of the plurality of signal lines, and correspond to five output signal systems 104 to 108 of non-linear processor 93 in FIG. 10.

In the present exemplary embodiment, the case where the division element and the division elements of adjacent-track detection signal generators 91 and 92 are divided into three in FIG. 3 as in the first exemplary embodiment has been described. In line with this, the configuration is employed where a number of the signals input to non-linear processor 93 in FIG. 9 is a total of nine, a number of the detection signals in each of the tracks being three. Similarly, non-linear processor 93 and equalization processor 94 in FIG. 10 are also each shown with the three track signals configured of three signal lines. This is an example of the exemplary embodiment of the present invention, and in the present invention, the configuration of the division element, a number of elements of the photodetector, and the configurations of the non-linear processor and the equalization processor are not limited thereto. In the present exemplary embodiment, for example, the division element that detects the target track whose information is to be acquired may have the configuration of the six regions in FIG. 5, one of the division elements that detect the adjacent tracks may have the configuration of the five regions in FIG. 7, and the other may have the configuration of the four regions in FIG. 8. Alternatively, any other combination may be used. In any case, the photodetector, the non-linear processor, and the equalization processor are provided according to the number of regions of the division element.

Further, in the present invention, the number of the adjacent-track detection signal generators may be one, and in this case, it corresponds to any one of the tracks adjacent to the target track whose information is to be acquired. Further, in the present invention, a configuration may be employed where the light amount signal resulting from detecting the target track whose information is to be acquired is stored in the memory of the adjacent-track detection signal generator, and the track adjacent to the target track whose information is to be acquired is scanned and detected, and at the same time, the light amount signal of the target track whose information stored in the memory is to be acquired is processed.

Sixth Exemplary Embodiment

In the present exemplary embodiment, an example in which two combinations of an equalization processor and an adder are configured in parallel will be described. The two equalization processors and adders will be referred to as a positive equalization processor and a positive adder that handle positive signals, and a negative equalization processor and a negative adder that handle negative signals. Same signals are input to each of the two equalization processors from the non-linear processor. A reproduction signal processor selects a signal having a small equalization error signal from output signals of the two adders and uses it for signal estimation. At this time, the gain controller supplies an amplification gain to any one of the two equalization processors in accordance with a sign of the output signal of the selected adder. For example, if the sign of the output signal of the selected adder is positive, the amplification gain is supplied to the positive equalization processor, and the negative equalization processor does not update the gain. With such a configuration, when the signals have different characteristics between positive and negative, the equalization processing can be performed separately, so that optimized processing can be implemented in each of the two cases.

While in the foregoing exemplary embodiments, the square, cube, and product have been described in the signal calculation of the non-linear processor, other signal arithmetic operations may also be included in these. For example, for light amount signals A and B, a signal of square of a difference is $(A-B)^2 = A^2 + B^2 - 2AB$, so that equalization processing arithmetic operation of a signal of the square of the difference $(A-B)^2$ is equalized to a result from combining equalization processing arithmetic operations of signals of square of A, square of B, and product of A and B. Therefore, when the equalization processing of the non-linear signal is considered, the square arithmetic operation of the difference is included in an arithmetic operation result of square and product. When the arithmetic operation result of the equalization processing is equalized in this way, an arithmetic operation other than the square, cube, and product can be expressed by combination of the square, cube, and product, so that description of all variations of the signal arithmetic operation is omitted here.

INDUSTRIAL APPLICABILITY

An optical disk reproducing device according to the present invention makes it possible to stably reproduce an optical disk having a reduced track pitch and a high density. Therefore, it can be used as an information processing device such as a computer, a server, an optical disk player, and an optical disk recorder having a large-capacity optical disk information device, which are applied devices of the optical disk reproducing device.

REFERENCE MARKS IN THE DRAWINGS

100: optical disk reproducing device
1: optical disk
2: blue semiconductor laser unit
3: laser mirror
4: objective lens
5: beam splitter
70, 71: division element
9, 72, 73, 74, 75, 76, 77: photodetector
13, 78, 93: non-linear processor
14, 79, 94: equalization processor
21, 80, 95: adder
22: reproduction signal processor
23, 81, 96: gain controller

The invention claimed is:

1. An optical disk reproducing device that has a groove-shaped track and reproduces information recorded on an optical disk capable of recording the information in a land portion and a groove portion of a groove, the optical disk reproducing device comprising:
    a laser light source that emits a light flux;
    an objective lens that condenses the light flux emitted from the laser light source to form a condensing spot on the optical disk;
    a division element that has a central region and two end regions sandwiching the central region, and divides a reflected light reflected and diffracted by the optical disk into a light flux in the central region and light fluxes in the two end regions;
    a photodetector that has a central light receiver that receives the light flux in the central region and two end light receivers that receive the light fluxes in the two end regions, and outputs light amount signals corresponding to light amounts of the received light fluxes;
    a non-linear processor that receives each of the light amount signals from the central light receiver and the two end light receivers, and outputs linear signals and non-linear signals obtained by processing the light amount signals by linear and non-linear arithmetic operations;
    an equalization processor that receives the linear signals and the non-linear signals and outputs signals each amplified with a predetermined gain;
    an adder that adds the amplified signals and outputs an equalization signal;
    a reproduction signal processor that processes the equalization signal and outputs a reproduction signal and an equalization error signal; and
    a gain controller that receives the equalization error signal and controls an amplification gain of the non-linear signals, wherein
    the photodetector has the central light receiver that receives the light flux in the central region and the two end light receivers that receive the light fluxes in the two end regions, and outputs the light amount signals corresponding to the light amounts of the received light fluxes, and
    the non-linear processor outputs the light amount signals as they are, or the linear signals each obtained by multiplying each of the light amount signals by a predetermined gain, and outputs arithmetic operation results of products of the light amount signals as the non-linear signals, each of the products of the light amount signals being obtained by combining two or more among the light amount signals, the combination being at least one type of combination.

2. The optical disk reproducing device according to claim 1, wherein the division element is divided into three in a direction corresponding to a radial direction of the optical disk, and has the central region and the two end regions.

3. The optical disk reproducing device according to claim 2, wherein the non-linear processor further outputs a squared signal of each of the light amount signals as the non-linear signal.

4. The optical disk reproducing device according to claim 2, wherein the non-linear processor further outputs a cubed signal of each of the light amount signals as the non-linear signal.

5. The optical disk reproducing device according to claim 2, wherein the non-linear processor outputs a product of the light amount signals output by the two end light receivers.

6. The optical disk reproducing device according to claim 2, wherein
    in the division element, the central region is further divided into three in a direction corresponding to a tangential direction of the optical disk, so that the division element has a center region and two central end regions, and
    in the photodetector, the central light receiver further has a center light receiver that receives a light flux in the center region, and two central end light receivers that receives light fluxes in the two central end regions, and the photodetector outputs the light amount signals corresponding to the light amounts of the received light fluxes.

7. The optical disk reproducing device according to claim 2, wherein
in the division element, the central region is further divided into two in a direction corresponding to the radial direction of the optical disk, so that the division element has two center regions, and
in the photodetector, the central light receiver has two center light receivers that receive light fluxes in the two center regions, and the photodetector outputs the light amount signals corresponding to the light amounts of the received light fluxes.

8. The optical disk reproducing device according to claim 6, wherein
in the division element, the center region is further divided into two in a direction corresponding to the radial direction of the optical disk, so that the division element has two divided center regions, and
in the photodetector, the center light receiver further has two divided center light receivers that receive light fluxes in the two divided center regions, and the photodetector outputs the light amount signals corresponding to the light amounts of the received light fluxes.

9. The optical disk reproducing device according to claim 8, wherein
the equalization processor and the adder have a positive equalization processor and a positive adder that handle a positive signal, and a negative equalization processor and a negative adder that handle a negative signal,
the reproduction signal processor selects a signal having a smaller equalization error signal from output signals of the two adders, and
the gain controller supplies an amplification gain to any one of the positive equalization processor and the negative equalization processor in accordance with a sign of the output signal of the selected adder.

10. The optical disk reproducing device according to claim 2, wherein
to the non-linear processor, signals are further added and input, the signals being obtained by two adjacent-track detection signal generators that output light amount signals resulting from scanning and detecting two adjacent tracks to a target track whose recorded information is to be acquired, and
the non-linear processor outputs the light amount signals output from the photodetector and the light amount signals output from the two adjacent-track detection signal generators as they are, or linear signals each obtained by multiplying the light amount signals output from each of the two adjacent-track detection signal generators by a predetermined gain, and outputs arithmetic operation results of products of the light amount signals as the non-linear signals, each of the products of the light amount signals being obtained by combining two or more among the light amount signals output from the photodetector, and the light amount signals output from the two adjacent-track detection signal generators, the combination being at least one type of combination.

\* \* \* \* \*